Figure 2A:
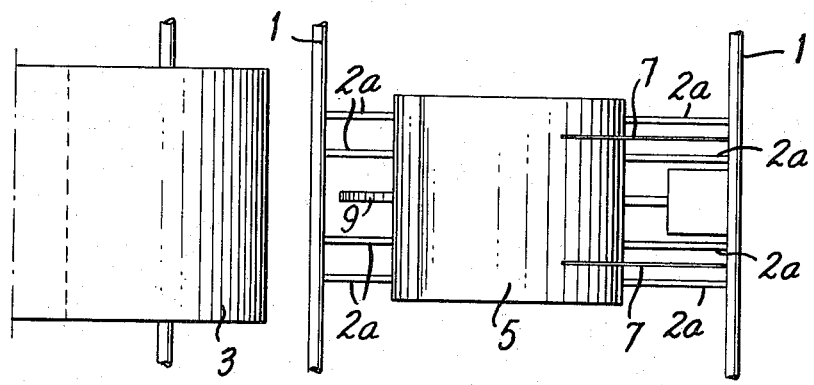

United States Patent
Nisula

[11] 3,871,255
[45] Mar. 18, 1975

[54] DEVICE FOR CUTTING PEAT BAND ROLLS
[75] Inventor: Pentti Samuel Nisula, Hamevaara, Finland
[73] Assignee: Lannen Sokeri Oy, Lansi-Sakyla, Finland
[22] Filed: May 30, 1973
[21] Appl. No.: 365,184

[52] U.S. Cl. .................. 83/155, 83/788, 83/425, 83/431, 83/417
[51] Int. Cl. ........ B26d 7/06, B26d 4/76, B26d 1/46
[58] Field of Search ............. 83/155, 425, 431, 788, 83/417, 147

[56] References Cited
UNITED STATES PATENTS
| | | | |
|---|---|---|---|
| 706,174 | 8/1902 | Goossen | 83/425 |
| 1,130,819 | 3/1915 | Hill | 83/417 |
| 3,207,063 | 9/1965 | Major | 83/431 X |
| 3,353,576 | 11/1967 | Cooper | 83/155 |

*Primary Examiner*—Willie G. Abercrombie
*Attorney, Agent, or Firm*—Bierman & Bierman

[57] ABSTRACT

A device for cutting peat band rolls in which the roll is moved onto a plurality of plates positioned above a saw, the plates opening at a selected time to permit the roll to move downwardly against the saw to cut the peat band roll.

6 Claims, 4 Drawing Figures

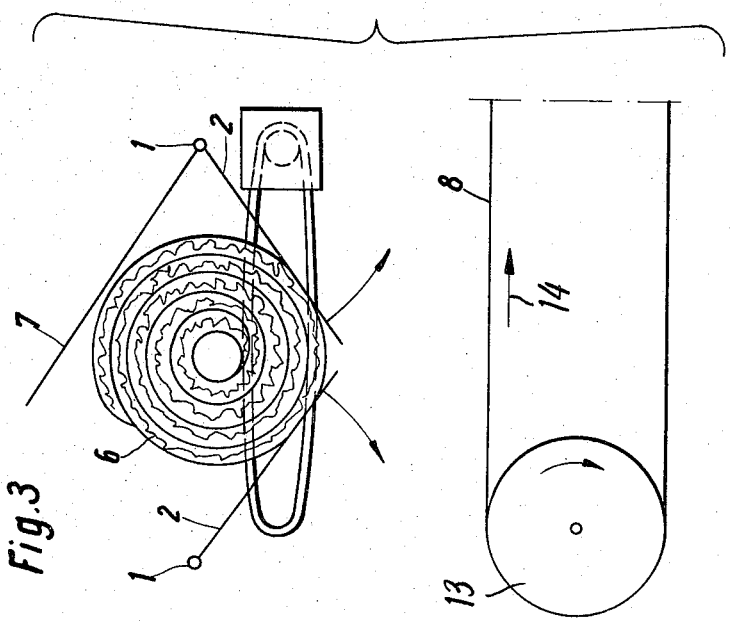
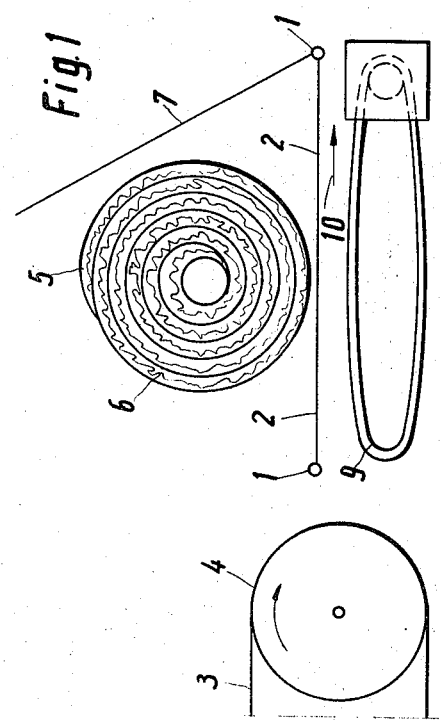
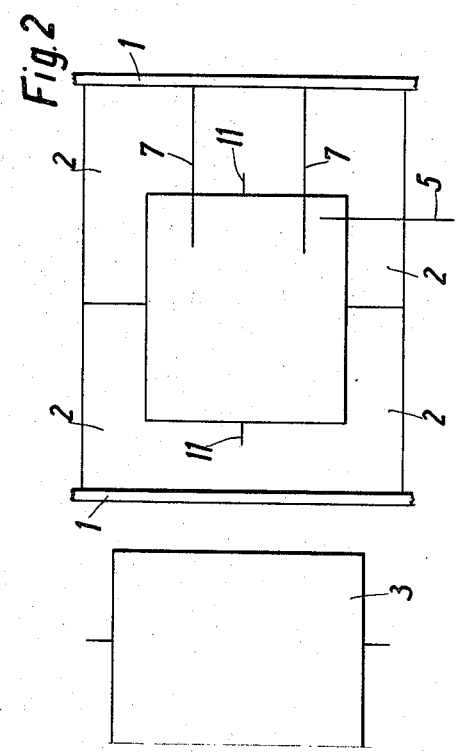

DEVICE FOR CUTTING PEAT BAND ROLLS

In the past, devices for producing seedlings, especially saplings, have been provided with two or more rollers arranged to tear peat brought by a conveyor from a peat supply. Below the rollers there is arranged a conveyor, such as a belt conveyor. The conveyor is generally continuously coated with plastic, cellophane or paper from a supply roll onto which the peat torn by the rollers falls to form a peat band. At the discharge end of the belt conveyor there is a rolling and winding device by means of which the peat band with its base material can be wound into a roll.

This invention provides a device for cutting the said roll into smaller sections or pieces.

One embodiment of the invention is illustrated in the accompanied drawing, in which FIG. 1 shows schematically a side view of a device according to the invention. FIG. 2 shows a top view of the device of FIG. 1, and FIG. 2A is a top view of another embodiment of the device shown in FIG. 1 showing the use of support rods in place of the support plates shown in FIG. 2. FIG. 3 shows a side view of the device of FIG. 1 at a later working stage.

Referring now to the drawings, the device has a pair of plates 2 rotatably mounted on hinges 1. The plates 2 can be locked into the position shown in FIGS. 1 and 2 so that they are in a continuous, approximately horizontal plane. Locking is achieved by conventional means (not shown).

A conveyor belt 3, supported by an end roller 4, is used to move a peat band roll 6 on to the plates 2. As peat band roll 6 arrives at the position shown in FIGS. 1 and 2, it comes into contact with an activating rod 5. When the rod 5 is contacted by the peat band roll it activates a conventional mechanism acting hydraulically or other conventional way, such as a hydraulic piston (not shown). A conventional limit switch or a photo cell may be used in conventional manner to sense motion of the arm 5 and to activate the said mechanism to gradually open the plates 2 to the position shown in FIG. 3, and even further as it becomes necessary to do so. As plates 2 open, the peat band roll 6 is lowered. At the same time, rods 7 are also lowered against the roll 6 by means of a mechanism which has been activated by the activator rod 5 or by the movement of the plate 2. The rods 7 can be arranged to pivot around the same shaft 1 as is the right hand side plate 2 as viewed in FIG. 1, or the rods can be provided with a separate shaft of their own. The rods 7 are preferably coated by plastic, for instance, which holds the plastic surface of the peat band roll. The rods 7 are preferably thick enough so that they will not press too deeply into the surface of the peat band roll. The rods can also be flat so that the flat side is pressed aginst the surface of the peat band roll.

The device of the present invention also includes a motor-driven saw having a blade 9 which runs in a conventional way as an endless chain in the direction shown by the arrow 10. The motor-driven saw is rigidly mounted to the frame of the device (not shown).

When the plates 2 are opened by rotation around the hinges 1 as shown in FIG. 3, the peat band roll 6 is lowered down against the blade 9 of the motor-driven saw which now cuts the roll into two pieces. The two halves of the peat band roll are then lowered onto a belt conveyor 8 (FIG. 3), the endless belt of which is supported by a roller 13 and runs in the direction shown by an arrow 14. The belt 8 runs intermittently so that when the peat band roll halves are lowered onto it, the belt moves the halves a distance approximately equal to the diameter of the peat band roll, or slightly longer. The belt is then stopped until the next peat band halves are lowered onto it. The intermittent movement of the belt 8 can be provided by synchronizing it with the opening of the plates 2, for instance. It is possible, of course, to watch the movement of the belt 8 and to activate its driving device manually to obtain the intermittent drive described above.

In order to enable the plates 2 to open downwards enough to permit the roll 6 to be lowered to the saw blade 9 and cut into pieces by the blade, the plate 2 must be provided with slots 11 so that when the plates 2 are moved downwardly, the blade 9 fits loosely in these slots 11 without interfering with the plates 2.

According to the invention, several parallel motor-driven saws may be provided below the plates 2 adjacent each other at the same level and at a selected distance from each other. The plates 2 are then provided with several slots corresponding to the saw blades. The roll 6 is cut into several pieces or slices when it is lowered down as described above. The belt 8 moves these slices to storage, in a manner similar to that described above when the roll is cut into halves.

According to the invention, the peat band roll can be made quite wide, or long in the direction of its axis, and it can then by cut into shorter pieces or slices. Seeds can be sown or seedlings or saplings can be transplanted into the circular end surfaces of the slices or pieces, unless the sowing or transplanting has been done when the peat band roll is first constituted.

The invention is not restricted to the embodiment described above and illustrated in the drawing. It can vary considerably within the scope of the claims. The plates 2 need not be flat. They can also be formed so that together they form a chute into which the roll 6 is rolled to be cut. The plates 2 can also be replaced by two or more pairs of rods 2a supporting the roll 6 (FIG. 2A).

The device according to the invention can be used also for cutting other objects besides peat band rolls, such as wood, paper rolls, or the like.

What is claimed is:

1. A device for cutting peat band rolls or the like, said device having a frame comprising: a chain saw mounted on the frame of the device, said chain saw being substantially horizontal and the cutting plane of the saw being vertical, a pair of supporting elements each being pivotally mounted at one end thereon above said chain saw, said supporting elements having their pivot axes substantially perpendicular to the vertical plane of said chain saw, said supporting elements supporting the item to be cut above said chain saw and having free ends adjacent each other, said free ends being located substantially midway between the ends of said chain saw, and means for pivoting said supporting elements towards said chain saw to move the said free ends away from each other and to lower the item to be cut against the chain saw, said support plates supporting the peat band roll during the cutting operation.

2. A device according to claim 1 wherein the supporting elements comprise two plates, each of which has a slot for permitting the chain saw to pass through said plates.

3. A device according to claim 1 wherein the support elements comprise parallel rods spaced a selected distance from each other to permit the chain saw to pass between the rods.

4. A device according to claim 1 further comprising a plurality of pivotable arms for engaging the upper surface of the item to be cut during the cutting operation.

5. A device according to claim 4 wherein said arms are flat.

6. A device for cutting peat band rolls or the like into several pieces transversely to their longitudinal direction, said device having a frame comprising at least two chain saws mounted to the frame of the device, each said chain saw being substantially horizontal and the cutting plane of each saw being vertical, a plurality of supporting elements each pivotably mounted at one end thereof, the pivot axes of said supporting elements being perpendicular to the vertical plane of each chain saw, said supporting elements being positioned above said chain saws, said supporting elements having their free ends adjacent each other for supporting the item to be cut above said chain saws, the adjacent free ends of said supporting elements being located substantially midway between the ends of said chain saws, means for pivoting the supporting elements towards said chain saws to move the said free ends away from each other and to permit the item to be lowered onto said chain saws to be cut into a plurality of individual sections, said supporting elements holding said peat band roll during cutting.

* * * * *